(12) United States Patent
Kapur et al.

(10) Patent No.: US 10,047,217 B2
(45) Date of Patent: Aug. 14, 2018

(54) ETHYLENE-BASED POLYMER COMPOSITIONS, AND ARTICLES PREPARED FROM THE SAME

(71) Applicant: Dow Global Technologies LLC, Midland, MI (US)

(72) Inventors: Mridula Kapur, Freeport, TX (US); Troy M. Tambling, Midland, MI (US); Stephanie M. Whited, South Charleston, WV (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/419,850

(22) PCT Filed: Sep. 12, 2013

(86) PCT No.: PCT/US2013/059484
§ 371 (c)(1),
(2) Date: Feb. 5, 2015

(87) PCT Pub. No.: WO2014/043364
PCT Pub. Date: Mar. 20, 2014

(65) Prior Publication Data
US 2015/0203672 A1    Jul. 23, 2015

Related U.S. Application Data

(60) Provisional application No. 61/700,372, filed on Sep. 13, 2012.

(51) Int. Cl.
*C08L 23/08* (2006.01)
*C08L 23/04* (2006.01)

(52) U.S. Cl.
CPC ........... *C08L 23/0815* (2013.01); *C08L 23/04* (2013.01); *C08L 2205/02* (2013.01)

(58) Field of Classification Search
CPC .................................................. C08L 23/0815
See application file for complete search history.

(56) References Cited

U.S. PATENT DOCUMENTS

| 6,187,866 B1 | 2/2001 | Jorgensen et al. |
| 6,604,598 B1 | 8/2003 | Rohde et al. |
| 6,982,237 B2 | 1/2006 | Wagner et al. |
| 8,129,472 B2 * | 3/2012 | Turner ............... C08L 23/04 525/191 |
| 9,175,111 B2 * | 11/2015 | Kapur ............... C08F 10/00 |
| 2006/0074194 A1 * | 4/2006 | Berthold ............ C08F 297/08 525/240 |
| 2007/0213205 A1 | 9/2007 | Mihan |
| 2009/0246433 A1 * | 10/2009 | Michie ............... C08K 5/43 428/36.9 |
| 2009/0306299 A1 | 12/2009 | Kipke et al. |
| 2010/0084363 A1 | 4/2010 | Michie, Jr. et al. |
| 2010/0093951 A1 | 4/2010 | Oikawa et al. |
| 2010/0292418 A1 * | 11/2010 | Jorgensen ............ C08F 10/00 526/116 |
| 2011/0034635 A1 * | 2/2011 | Kapur ............... C08F 10/00 525/240 |
| 2013/0137828 A1 | 5/2013 | Michie, Jr. et al. |

FOREIGN PATENT DOCUMENTS

| EP | 0533154 A1 | 3/1993 |
| EP | 2105464 A1 | 9/2009 |
| WO | 200391329 | 11/2003 |
| WO | 2008/137722 A1 | 11/2008 |
| WO | 2009/085922 A1 | 7/2009 |

OTHER PUBLICATIONS

Dow Global Technologies LLC, EP Appln. No. 13765911.6-1302, Rejection dated Apr. 21, 2015.
PCT/US2013/059484, International Search Report and Written Opinion of the International Searching Authority dated Nov. 13, 2013.
PCT/US2013/059484, International Preliminary Report on Patentability dated Mar. 26, 2015.

* cited by examiner

*Primary Examiner* — Irina Krylova

(57) ABSTRACT

The invention provides a composition comprising a first composition, wherein the first composition comprises a first ethylene-based polymer and a second ethylene-based polymer, and wherein the first composition has a high load melt index ($I_{21}$) less than 17, a density greater than, or equal to, 0.952 g/cm³, a molecular weight distribution MWD (conv), defined as the ratio of the weight average molecular weight to the number average molecular weight (Mw (conv)/Mn (conv)), greater than, or equal to, 11; and a viscosity ratio, $\eta(0.01\ s^{-1})/\eta(100\ s^{-1})$ at 190° C., greater than, or equal to, 60.

17 Claims, 1 Drawing Sheet

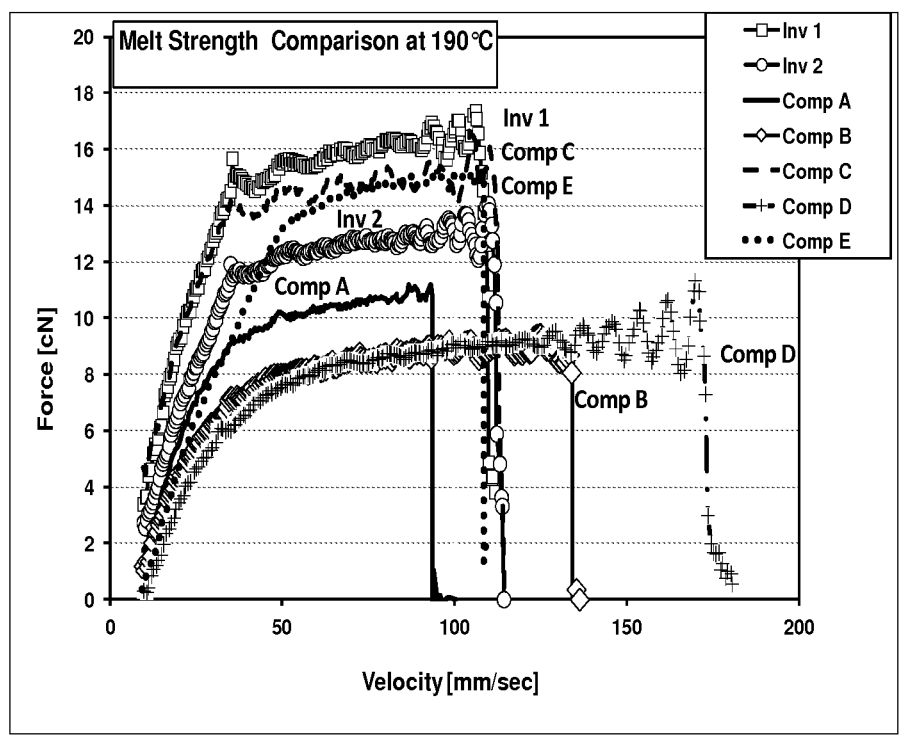

ETHYLENE-BASED POLYMER COMPOSITIONS, AND ARTICLES PREPARED FROM THE SAME

REFERENCE TO RELATED APPLICATIONS

This application claims the benefit of U.S. Provisional Application 61/700,372, filed Sep. 13, 2012.

BACKGROUND

The present invention provides ethylene-based polymer compositions, and articles prepared from the same. The compositions of the invention are particularly suitable for use in extrusion blow molded articles, and, in particular, jerry cans and tight head pail containers.

Prior approaches have included polymers with good mechanical properties but poor processing or improved processing, at the expense of mechanical properties. Trimodal resins have been designed for jerry cans using complex three reactor polymerization processes. Polymer compositions are described in the following references: WO2009/085922, WO2008/137722, WO2003/091329, US20070213205, US20090306299, US20100093951, U.S. Pat. No. 6,604,598, EP2105464A1 and EP0533154A1. However, there remains a need for new compositions that provide improved processability, as well as excellent mechanical properties. These needs have been met by the following invention.

SUMMARY OF THE INVENTION

The invention provides a composition comprising a first composition, wherein the first composition comprises a first ethylene-based polymer and a second ethylene-based polymer, and wherein the first composition has a high load melt index ($I_{21}$) less than 17 g/10 min, a density greater than, or equal to, 0.952 g/cm³, a molecular weight distribution MWD (conv), defined as the ratio of the weight average molecular weight to the number average molecular weight (Mw (conv)/Mn (conv)), greater than, or equal to, 11; and a viscosity ratio, $\eta(0.01\ s^{-1})/\eta(100\ s^{-1})$ at 190° C., greater than, or equal to, 60.

BRIEF DESCRIPTION OF THE DRAWINGS

FIG. 1 depicts melt strength (MS) profiles of some inventive and comparative resins.

DETAILED DESCRIPTION OF THE INVENTION

As discussed above, the invention provides a composition comprising a first composition, wherein the first composition comprises a first ethylene-based polymer and a second ethylene-based polymer, and wherein the first composition has a high load melt index ($I_{21}$) less than 17 g/10 min, a density greater than, or equal to, 0.952 g/cm³, a MWD (conv), defined as the ratio of the weight average molecular weight Mw to number average molecular weight Mn, greater than, or equal to, 11; and a viscosity ratio, $\eta(0.01\ s^{-1})/\eta(100\ s^{-1})$ at 190° C., greater than, or equal to, 60.

An inventive composition may comprise a combination of two or more embodiments as described herein.

The first composition may comprise a combination of two or more embodiments as described herein.

The first ethylene-based polymer may comprise a combination of two or more embodiments as described herein.

The second ethylene-based polymer may comprise a combination of two or more embodiments as described herein.

In one embodiment, the first composition has a viscosity ratio, $\eta(0.01\ s^{-1})/\eta(100\ s^{-1})$ at 190° C., greater than, or equal to, 65, further greater than, or equal to, 70.

In one embodiment, the first composition has a viscosity ratio, $\eta(0.01\ s^{-1})/\eta(100\ s^{-1})$ at 190° C., less than, or equal to, 110, further less than, or equal to, 100.

In one embodiment, the first composition has a viscosity ratio, $\eta(0.01\ s^{-1})/\eta(100\ s^{-1})$ at 190° C., from 60 to 110, further from 60 to 100.

In one embodiment, the first composition has a viscosity ratio, $\eta(0.01\ s^{-1})/\eta(100\ s^{-1})$ at 190° C., from 65 to 110, further from 65 to 100.

In one embodiment, the first composition has a viscosity ratio, $\eta(0.01\ s^{-1})/(100\ s^{-1})$ at 190° C., from 70 to 110, further from 70 to 100.

In one embodiment, the first composition has a melt viscosity ($\eta$), at 0.01 s⁻¹ and 190° C., less than, or equal to, 200,000 Pa·s, further less than, or equal to, 195,000 Pa·s.

In one embodiment, the first composition has a melt viscosity ($\eta$), at 0.01 s⁻¹ and 190° C., greater than 120,000 P·s, further greater than 130,000 Pa·s.

In one embodiment, the first composition has a melt viscosity ($\eta$), at 0.01 s⁻¹ and 190° C., from 120,000 to 210,000 P·s, further from 130,000 to 200,000 Pa·s.

In one embodiment, the first composition has a melt viscosity ($\eta$), at 0.01 s⁻¹ and 190° C. from 120,000 to 200,000 Pa·s, further from 130,000 to 195,000 Pa·s.

In one embodiment, the first composition has an I21/I5 ratio less than, or equal to, 25.0, further less than, or equal to, 24.5, and further less than, or equal to, 24.0.

In one embodiment, the first composition has an I21/I5 ratio greater than, or equal to, 16.0, further greater than, or equal to, 18.0, and further greater than, or equal to, 19.0.

In one embodiment, the first composition has a tan delta, at 0.01 s⁻¹ and 190° C., less than 2.5, further less than 2.3, and further less than 2.0.

In one embodiment, the first composition has a tan delta, at 0.01 s⁻¹ and 190° C., less than 2.3, further less than 2.0, and further less than 1.8.

In one embodiment, the first composition has a tan delta at 0.01 sec⁻¹, and 190° C. greater than, or equal to, 1.1, further greater than, or equal to, 1.3.

In one embodiment, the first composition has a tan delta at 0.01 sec⁻¹, and 190° C. greater than, or equal to, 1.2, further greater than, or equal to, 1.4.

In one embodiment, the first composition has a tan delta ratio (tan delta at 0.01 s⁻¹,)/tan delta at (100 s⁻¹) at 190° C. less than, or equal to, 3.5, further less than, or equal to, 3.2.

In one embodiment, the first composition has a tan delta ratio (tan delta at 0.01 s⁻¹/tan delta at 100 s⁻¹) at 190° C. greater than, or equal to, 2.0, further greater than, or equal to, 2.2.

In one embodiment, the first composition has a density from 0.952 to 0.958 g/cm³, further from 0.953 to 0.957 g/cm³, further from 0.953 to 0.956 g/cm³ (1 cm³=1 cc).

In one embodiment, the first composition has a MWD (conv) greater than, or equal to, 12, further greater than, or equal to, 14, further greater than, or equal to, 16.

In one embodiment, the first composition has a MWD (conv) less than, or equal to, 30, further less than, or equal to, 28.

In one embodiment, the first composition has a MWD (conv) from 10 to 30, further from 12 to 28.

In one embodiment, the first composition has an Mz (conv) greater than, or equal to, 1,000,000 g/mole, further greater than, or equal to, 1,100,000 g/mole.

In one embodiment, the first composition has a melting temperature (Tm) greater than 125° C., and further greater than 128° C., and further greater than, or equal to, 130° C., as determined by DSC.

In one embodiment, the first composition has vinyls/1000 C, as determined by ASTM D6248, less than, or equal to, 0.3, more preferably less than, or equal to, 0.2.

In one embodiment, the first composition has vinyls/1000 C, as determined by ASTM D6248, less than, or equal to, 0.30, further less than, or equal to, 0.25, further less than, or equal to, 0.21.

In one embodiment, the first composition has vinyls/1000 C, as determined by ASTM D6248, greater than, or equal to, 0.01, further greater than, or equal to, 0.02.

In one embodiment, the composition has vinyls/1000 C, as determined by ASTM D6248, less than or equal to 0.3, more preferably less than or equal to 0.2.

In one embodiment, the composition has vinyls/1000 C, as determined by ASTM D6248, less than, or equal to, 0.30, further less than, or equal to, 0.25, further less than, or equal to, 0.21.

In one embodiment, the composition has vinyls/1000 C, as determined by ASTM D6248, greater than, or equal to, 0.01, further greater than, or equal to, 0.02.

In one embodiment, the first ethylene-based polymer is an ethylene-based interpolymer. In a further embodiment, the first ethylene-based polymer is an ethylene-based copolymer.

In one embodiment, the second ethylene-based polymer is an ethylene-based interpolymer. In a further embodiment, the second ethylene-based polymer is an ethylene-based copolymer.

In one embodiment, the second ethylene-based polymer is a polyethylene homopolymer.

In one embodiment, the first ethylene-based polymer is a heterogeneously branched ethylene-based interpolymer, and further a copolymer. Heterogeneously branched interpolymers, as known in the art, are typically produced by Ziegler-Natta type catalysts, and contain a non-homogeneous distribution of comonomer among the molecules of the interpolymer.

In one embodiment, the second ethylene-based polymer is a heterogeneously branched ethylene-based interpolymer, and further a copolymer.

In one embodiment, the first ethylene-based polymer is formed in the presence of at least one catalyst, which comprises at least two catalytic sites.

In one embodiment, the second ethylene-based polymer is formed in the presence of at least one catalyst, which comprises at least two catalytic sites.

In one embodiment, both the first ethylene-based polymer and the second ethylene-based polymer are formed in the presence of at least one catalyst, which comprises at least two catalytic sites.

In one embodiment, the first ethylene-based interpolymer is an ethylene/α-olefin interpolymer, and further an ethylene/α-olefin copolymer. In a further embodiment, the α-olefin is selected from the group consisting of C3 to C20 α-olefins, further C3 to C10 α-olefins. In yet a further embodiment, the α-olefin is selected from the group consisting of propylene, 1-butene, 1-pentene, 1-hexene, 1-heptene, 1-octene, 4-methyl-1-pentene, 1-nonene and 1-decene, and is preferably selected from the group consisting of propylene, 1-butene, 1-hexene and 1-octene, and more preferably, the α-olefin is 1-hexene.

In one embodiment, the second ethylene-based interpolymer is an ethylene/α-olefin interpolymer, and further an ethylene/α-olefin copolymer. In a further embodiment, the α-olefin is selected from the group consisting of C3 to C20 α-olefins, further C3 to C10 α-olefins. In yet a further embodiment, the α-olefin is selected from the group consisting of propylene, 1-butene, 1-pentene, 1-hexene, 1-heptene, 1-octene, 4-methyl-1-pentene, 1-nonene and 1-decene, and is preferably selected from the group consisting of propylene, 1-butene, 1-hexene and 1-octene, and more preferably, the α-olefin is 1-hexene.

In one embodiment, the first ethylene-based polymer is present in an amount from 40 to 70 weight percent, further from 50 to 70 weight percent, and further from 55 to 70 weight percent, based on the sum weight of the first ethylene-based polymer and the second ethylene-based polymer.

In one embodiment, the second ethylene-based polymer is present in an amount from 30 to 60 weight percent, further from 30 to 50 weight percent, and further from 30 to 45 weight percent, based on the sum weight of the first ethylene-based polymer and the second ethylene-based polymer.

In one embodiment, the first composition comprises greater than 90 weight percent, further greater than 95 weight percent, and further greater than 98 weight percent, of the first ethylene-based polymer and the second ethylene-based polymer, based on the weight of the first composition.

In one embodiment, the composition comprises greater than 90 weight percent, further greater than 95 weight percent, and further greater than 98 weight percent, of the first ethylene-based polymer and the second ethylene-based polymer, based on the weight of the composition.

In one embodiment, the first composition has an extrudate swell (t300 measured at 300 $s^{-1}$ shear rate and 190° C.) greater than, or equal to, 18 seconds.

In one embodiment, the first composition has an extrudate swell (t1000 measured at 1000 $s^{-1}$ shear rate and 190° C.) greater than, or equal to, 6 seconds.

In one embodiment, the composition has an extrudate swell (t300 measured at 300 $s^{-1}$ shear rate and 190° C.) greater than, or equal to, 18 seconds.

In one embodiment, the composition has an extrudate swell (t1000 measured at 1000 $s^{-1}$ shear rate and 190° C.) greater than, or equal to, 6 seconds.

In one embodiment, the first composition has an environmental stress crack resistance (ESCR $F_{50}$) value greater than, or equal to, 400 hours, as determined by ASTM D-1693, Method B, in 10% by volume aqueous IGEPAL CO 630 solution.

In one embodiment, the composition has an ESCR $F_{50}$ value greater than, or equal to, 400 hours, as determined by ASTM D-1693, Method B, in 10% by volume aqueous IGEPAL CO 630 solution.

The invention also provides an article comprising at least one component formed from an inventive composition. In a further embodiment, the article is a blow molded article. In a further embodiment, the article is an extrusion, blow molded article.

An article may comprise a combination of two or more embodiments as described herein.

The composition may comprise a combination of two or more embodiments as described herein.

The first composition may comprise a combination of two or more embodiments as described herein.

The first ethylene-based polymer may comprise a combination of two or more embodiments as described herein.

The second ethylene-based polymer may comprise a combination of two or more embodiments as described herein.

It has been discovered that the inventive compositions offer overall increased melt strength for improved parison sag resistance, higher swell, and broad molecular weight distribution for easy processing, as compared to conventional compositions of the art. In comparison to unimodal resins, it has been discovered that the inventive resins offer equivalent processing, superior mechanical properties, and the option to produce down gauged containers, while meeting key performance criteria.

Composition

In one embodiment, the composition comprises greater than, or equal to, 90 weight percent, further greater than, or equal to, 95 weight percent, and more further greater than, or equal to, 98 weight percent of the sum weight of the first ethylene-based polymer and second ethylene-based polymer, based on the weight of the composition.

In one embodiment, the composition comprises greater than, or equal to, 90 weight percent, further greater than, or equal to, 95 weight percent, and more further greater than, or equal to, 98 weight percent of the first composition, based on the weight of the composition.

In one embodiment, the composition does not comprise any other polymer, except the first ethylene-based polymer and the second ethylene-based polymer.

In one embodiment, the composition does not comprise any other polymer present in an amount greater than 5 weight percent, further in an amount greater than 2.5 weight percent, based on the weight of the composition, except the first ethylene-based polymer and second ethylene-based polymer.

In one embodiment, the composition does not comprise an azide coupling agent.

In one embodiment, the composition has a high load melt index ($I_{21}$) from 5 to 17 g/10 min, further from 6 to 15 g/10 min.

In one embodiment, the composition has a melt index ($I_5$) from 0.1 to 1 g/10 min, further from 0.2 to 0.8 g/10 min.

In one embodiment, the composition has a viscosity ratio, $\eta(0.01\ s^{-1})/\eta(100\ s^{-1})$ at 190° C., greater than, or equal to, 65, further greater than, or equal to, 70.

In one embodiment, the composition has a viscosity ratio, $\eta(0.01\ s^{-1})/\eta(100\ s^{-1})$ at 190° C., less than, or equal to, 110, further less than, or equal to, 100.

In one embodiment, the composition has a viscosity ratio, $\eta(0.01\ s^{-1})/\eta(100\ s^{-1})$ at 190° C., from 60 to 110, further from 60 to 100.

In one embodiment, the composition has a viscosity ratio, $\eta(0.01\ s^{-1})/\eta(100\ s^{-1})$ at 190° C., from 65 to 110, further from 65 to 100.

In one embodiment, the composition has a viscosity ratio, $\eta(0.01\ s^{-1})/\eta(100\ s^{-1})$ at 190° C. from 70 to 110, further from 70 to 100.

In one embodiment, the composition has a melt viscosity ($\eta$), at 0.01 $s^{-1}$ and 190° C., less than, or equal to, 200,000 Pa·s, further less than, or equal to, 195,000 Pa·s.

In one embodiment, the composition has a melt viscosity ($\eta$), at 0.01 $s^{-1}$ and 190° C., greater than 120,000 Pa·s, further greater than 130,000 Pa·s.

In one embodiment, the composition has a melt viscosity ($\eta$), at 0.01 $s^{-1}$ and 190° C., from 120,000 to 210,000 Pa·s, further from 130,000 to 200,000 Pa·s.

In one embodiment, the composition has a melt viscosity ($\eta$), at 0.01 $s^{-1}$ and 190° C., from 120,000 to 200,000 Pa·s, further from 130,000 to 195,000 Pa·s.

In one embodiment, the composition has an I21/I5 ratio less than, or equal to, 25.0, further less than, or equal to, 24.5, and further less than, or equal to, 24.0.

In one embodiment, the composition has an I21/I5 ratio greater than, or equal to, 16.0, further greater than, or equal to, 18.0, and further greater than, or equal to, 19.0.

In one embodiment, the composition has a tan delta, at 0.01 $s^{-1}$ and 190° C., less than 2.5, further less than 2.3, and further less than 2.0.

In one embodiment, the composition has a tan delta, at 0.01 $s^{-1}$ and 190° C., less than 2.3, further less than 2.0, and further less than 1.8.

In one embodiment, the composition has a tan delta at 0.01 $sec^{-1}$, and 190° C. greater than, or equal to, 1.1, further greater than, or equal to, 1.3.

In one embodiment, the composition has a tan delta at 0.01 $sec^{-1}$, and 190° C. greater than, or equal to, 1.2, further greater than, or equal to, 1.4.

In one embodiment, the composition has a tan delta ratio (tan delta at 0.01 $s^{-1}$,)/tan delta at (100 $s^{-1}$) at 190° C. less than, or equal to, 3.5, further less than, or equal to, 3.2. In one embodiment, the composition has a tan delta ratio (tan delta at 0.01 $s^{-1}$/tan delta at 100 $s^{-1}$) at 190° C. greater than, or equal to, 2.0, further greater than, or equal to, 2.2.

In one embodiment, the composition has a density from 0.952 to 0.958 g/cm³, further from 0.953 to 0.957 g/cm³, further from 0.953 to 0.956 g/cm³ (1 cm³=1 cc).

In one embodiment, the composition has a MWD (conv) greater than, or equal to, 12, further greater than, or equal to, 14, further greater than, or equal to, 16.

In one embodiment, the composition has a MWD (conv) less than, or equal to, 30, further less than, or equal to, 28.

In one embodiment, the composition has a MWD (conv) from 10 to 30, further from 12 to 28.

In one embodiment, the composition has an Mz (conv) greater than, or equal to, 1,000,000 g/mole, further greater than, or equal to, 1,100,000 g/mole.

In one embodiment, the composition has a melting temperature (Tm) greater than 125° C. and further greater than 128° C., and further greater than, or equal to, 130° C., as determined by DSC.

The composition may comprise a combination of two or more embodiments as described herein.

First Composition

In one embodiment, the first composition comprises greater than, or equal to, 90 weight percent, further greater than, or equal to, 95 weight percent, and more further greater than, or equal to, 98 weight percent of the sum weight of the first ethylene-based polymer and second ethylene-based polymer, based on the weight of the first composition.

In one embodiment, the first composition does not comprise any other polymer, except the first ethylene-based polymer and the second ethylene-based polymer.

In one embodiment, the first composition does not comprise any other polymer present in an amount greater than 5 weight percent, further in an amount greater than 2.5 weight percent, based on the weight of the first composition, except the first ethylene-based polymer and second ethylene-based polymer.

In one embodiment, the first composition has a high load melt index ($I_{21}$) from 5 to 17 g/10 min, further from 6 to 15 g/10 min.

In one embodiment, the first composition has a melt index ($I_5$) from 0.1 to 1 g/10 min, further from 0.2 to 0.8 g/10 min.

The first composition may comprise a combination of two or more embodiments as described herein.

First Ethylene-Based Polymer

In one embodiment, the first ethylene-based polymer has a density less than, or equal to, 0.955 g/cm$^3$, further less than, or equal to, 0.950 g/cm$^3$, further less than, or equal to, 0.945 g/cm$^3$, and further less than, or equal to, 0.940 g/cm$^3$. In a further embodiment, the first ethylene-based polymer is an ethylene-based interpolymer, and further an ethylene-based copolymer.

In one embodiment, the first ethylene-based polymer has a density greater than, or equal to, 0.915 g/cm$^3$, further greater than, or equal to, 0.920 g/cm$^3$, further greater than, or equal to, 0.925 g/cm$^3$, and more further greater than, or equal to, 0.930 g/cm$^3$, or greater than, or equal to, 0.935 g/cm$^3$. In a further embodiment, the first ethylene-based polymer is an ethylene-based interpolymer, and further an ethylene-based copolymer.

In one embodiment, the density of the first ethylene-based polymer is in the range from 0.915 to 0.955 g/cm$^3$, further in the range from 0.920 to 0.950 g/cm$^3$, further in the range from 0.925 to 0.950 g/cm$^3$. In a further embodiment, the first ethylene-based polymer is an ethylene-based interpolymer, and further an ethylene-based copolymer.

In one embodiment, the density of the first ethylene-based polymer is in the range from 0.930 to 0.950 g/cm$^3$, further in the range from 0.932 to 0.945 g/cm$^3$, further in the range from 0.934 to 0.945 g/cm$^3$. In a further embodiment, the first ethylene-based polymer is an ethylene-based interpolymer, and further an ethylene-based copolymer.

In one embodiment, the first ethylene-based polymer has a melt index ($I_{21}$) less than, or equal to, 2.0 g/10 min, further less than, or equal to, 1.5 g/10 min, further less than, or equal to, 1.0 g/10 min, and further less than, or equal to, 0.8 g/10 min. In a further embodiment, the first ethylene-based polymer is an ethylene-based interpolymer, and further an ethylene-based copolymer.

In one embodiment, the first ethylene-based polymer has a melt index ($I_{21}$) greater than, or equal to, 0.1 g/10 min, further greater than, or equal to, 0.2 g/10 min, further greater than, or equal to, 0.3 g/10 min, and further greater than, or equal to, 0.4 g/10 min. In a further embodiment, the first ethylene-based polymer is an ethylene-based interpolymer, and further an ethylene-based copolymer.

In one embodiment, the first ethylene-based polymer has a higher molecular weight than the second ethylene-based polymer, as determined by the polymerization conditions of each component, melt index, GPC methods (molecular weights and/or average molecular weights), and/or other methods known in the art.

In one embodiment, the first ethylene-based polymer has a molecular weight distribution (Mw/Mn ratio) greater than 3, further greater than 3.5, and more further greater than 3.8, as determined by conventional GPC.

In one embodiment, the first ethylene-based polymer is an ethylene/α-olefin interpolymer, and further an ethylene/α-olefin copolymer. In a preferred embodiment, the α-olefin is a C3-C20 α-olefin, further a C3-C10 α-olefin, further a C4-C10 α-olefin, further a C4-C8 α-olefin, and further C6-C8 α-olefin. Preferred α-olefins include 1-hexene and 1-octene, and further 1-hexene.

In one embodiment, the first ethylene-based interpolymer is an ethylene/1-hexene interpolymer The first ethylene-based polymer may comprise a combination of two or more embodiments as described herein.

Second Ethylene-Based Polymer

In one embodiment, the second ethylene-based polymer has a density greater than, or equal to, 0.955 g/cm$^3$, further greater than, or equal to, 0.960 g/cm$^3$, and further greater than, or equal to, 0.965 g/cm$^3$. In a further embodiment, the second ethylene-based polymer is an ethylene-based interpolymer, and further an ethylene-based copolymer. In another embodiment, the second ethylene-based polymer is a polyethylene homopolymer.

In one embodiment, the second ethylene-based polymer has a density less than, or equal to, 0.980 g/cm$^3$, further less than, or equal to, 0.975 g/cm$^3$. In a further embodiment, the second ethylene-based polymer is an ethylene-based interpolymer, and further an ethylene-based copolymer. In another embodiment, the second ethylene-based polymer is a polyethylene homopolymer.

In one embodiment, the second ethylene-based polymer has a density from 0.960 to 0.980 g/cm$^3$, further from 0.965 to 0.975 g/cm$^3$. In a further embodiment, the second ethylene-based polymer is an ethylene-based interpolymer, and further an ethylene-based copolymer. In another embodiment, the second ethylene-based polymer is a polyethylene homopolymer.

In one embodiment, the second ethylene-based polymer is an ethylene/α-olefin interpolymer, and further an ethylene/α-olefin copolymer. In a preferred embodiment, the α-olefin is a C3-C20 α-olefin, further a C3-C10 α-olefin, further a C4-C8 α-olefin, and further a C6-C8 α-olefin. Especially preferred α-olefins include 1-hexene and 1-octene, and further 1-hexene.

In one embodiment, the second ethylene-based polymer is an ethylene/1-hexene copolymer.

In another embodiment, the second ethylene-based polymer is a polyethylene homopolymer.

The second ethylene-based polymer may comprise a combination of two or more embodiments as described herein.

Additives

The inventive compositions may contain one or more additives. Additives include, but are not limited to, processing aids, acid neutralizers, UV stabilizers, hydro peroxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents, fatty acid stearates, fluoroelastomers, fillers, and combinations thereof.

Fabricated Articles

The compositions of the present invention can be used to manufacture a shaped article, or one or more components of a shaped article. Such articles may be single-layer or multilayer articles, which are typically obtained by suitable known conversion techniques, applying heat, pressure, or a combination thereof, to obtain the desired article. Suitable conversion techniques include, for example, extrusion blow-molding, co-extrusion blow-molding, injection blow molding, injection molding, injection stretch blow molding, compression molding, compression blow forming, rotomolding, extrusion, pultrusion, calendering and thermoforming. Shaped articles provided by the invention include, for example, jerry cans, tight head pail containers, drums, bottles, pipes, drip tapes and tubing, geomembranes, films, sheets, fibers, profiles and molded articles. Films include, but are not limited to, blown films, cast films, and bi-oriented films.

The compositions according to the present invention are particularly suitable for fabrication of extrusion blow molded containers that have an excellent balance of mechanical properties. Furthermore, the container weight can be reduced, while still meeting the container performance requirements. This is advantageous for reducing container cost as well as reducing waste material sent to landfills.

DEFINITIONS

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. As known in the art, trace amounts of impurities (for example, catalyst residues) may be incorporated into and/or within a polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene-based interpolymer," as used herein, refers to an interpolymer that comprises, in polymerized form, a majority amount of ethylene monomer (based on the weight of the interpolymer), and at least one comonomer.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The terms "blend" or "polymer blend," as used herein, refer to a blend of two or more polymers. Such a blend may or may not be miscible. Such a blend may or may not be phase separated. Such a blend may or may not contain one or more domain configurations, as determined from transmission electron microscopy, light scattering, x-ray scattering, and other methods known in the art.

The term "polyethylene homopolymer," and like terms, as used herein, refer to a polymer polymerized in a reactor in the presence of ethylene, and in which no fresh comonomer is fed into the reactor. Fresh comonomer, as known in the art, refers to a feed source of comonomer located outside a reactor or located outside one or more reactors operated in series or parallel, and which comonomer is fed into a reactor from this outside feed source. Very low levels of comonomer, if any, are present in the reactor, in which the homopolymer is polymerized. Typical "comonomer to ethylene" molar ratio is "less than 0.001" to 1 (as determined by the minimum level of comonomer detected by an on-line gas chromatography instrument in the reactor at issue).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to materiality or operability. The term "consisting of" excludes any component, step or procedure not specifically delineated or listed.

TEST METHODS

Density

Resin density was measured by the Archimedes displacement method, ASTM D792, Method B, in isopropanol. Specimens were measured within one hour of molding, after conditioning in the isopropanol bath, at 23° C., for eight minutes, to achieve thermal equilibrium prior to measurement. The specimens were compression molded according to ASTM D4703, Annex A, with a five minutes initial heating period at about 190° C. and a 15° C./min cooling rate per Procedure C. Each specimen was cooled to 45° C. in the press, with continued cooling until "cool to the touch."

Melt Flow Rate by Extrusion Plastomer

Melt flow rate measurements were performed according to ASTM D1238, Condition 190° C./2.16 kg, Condition 190° C./5 kg and Condition 190° C./21.6 kg, which are known as $I_2$, $I_5$ and $I_{21}$, respectively (ethylene-based polymers). Melt flow rate is inversely proportional to the molecular weight of the polymer. Thus, the higher the molecular weight, the lower the melt flow rate, although the relationship is not linear. Melt Flow Ratio (MFR) is the ratio of melt flow rate ($I_{21}$) to melt flow rate ($I_2$), unless otherwise specified.

Flexural and Secant Modulus Properties

The resin stiffness was characterized by measuring the Flexural Modulus at 5% strain and Secant Modulus at 1% strain, and a test speed of 0.5 inch/min (13 mm/min), per ASTM D790 Method B. The specimens were compression molded according to ASTM D4703 Annex 1, with a five minutes initial heating period, at about 190° C., and a 15° C./min cooling rate per Procedure C. Each specimen was cooled to 45° C., in the press, with continued cooling until "cool to the touch."

Tensile Properties

Tensile strength at yield, elongation at yield, ultimate tensile strength, and elongation at break were measured according to ASTM D638, with a test speed of two inches per minute. All measurements were performed at 23° C., on rigid type IV specimens, which were compression molded per ASTM D4703, Annex A-1, with a five minute initial heating period at about 190° C., and a 15° C./min cooling rate per Procedure C. The specimen was cooled to 45° C., in the press, with continued cooling until "cool to the touch."

Environmental Stress Crack Resistance (ESCR)

The resin environmental stress crack resistance (ESCR) was measured per ASTM D1693, Method B, with either 10% or 100%, by volume, IGEPAL CO-630 (vendor Rhone-Poulec, N.J.). Specimens were molded according to ASTM D4703, Annex A, with a five minute initial heating period, at about 190° C., and a 15° C./min cooling rate per Procedure C. Each specimen was cooled to 45° C. in the press, with continued cooling until "cool to the touch."

In the ESCR test, the susceptibility of a resin to mechanical failure by cracking was measured under constant strain conditions, and in the presence of a crack accelerating agent, such as, soap, a wetting agent, and the like.

Per ASTMD1693 Method B, measurements were carried out on notched specimens, in a 10%, by volume, IGEPAL CO-630 aqueous solution, maintained at 50° C. Ten specimens were evaluated per measurement. The ESCR value of the resin was reported as F50, the calculated 50% failure time from the probability graph.

Differential Scanning Calorimetry (DSC)

The peak melting temperature ($T_m$), heat of fusion (ΔHm), peak crystallization temperature (Tc), and heat of crystallization (Mc), were generated via a TA Instruments Model Q1000 DSC, equipped with an RCS (refrigerated cooling system) cooling accessory and an auto sampler. A nitrogen purge gas flow of 50 ml/min was used throughout. The sample was pressed into a thin film, using a press at 175° C. and 1500 psi (10.3 MPa) maximum pressure, for about 15 seconds, then air-cooled to room temperature at atmospheric pressure. About 3 to 10 mg of material was then cut into a 6 mm diameter disk using a paper hole punch, weighed to the nearest 0.001 mg, placed in a light aluminum pan (ca 50 mg), and then crimped shut.

The thermal behavior of the sample was investigated with the following temperature profile. The sample was rapidly heated to 180° C., and held isothermal for three minutes, in order to remove any previous thermal history. The sample was then cooled to −40° C., at 10° C./min cooling rate, and was held at −40° C. for three minutes. The sample was then heated to 150° C. at 10° C./min heating rate. The cooling and second heating curves were recorded. The Tc and ΔHc were determined from the cooling curve, and the Tm and ΔHm were determined from the second heating curve.

Gel Permeation Chromatography Conventional (GPC Conv)

The chromatographic system consisted of either a Polymer Laboratories Model PL-210 or a Polymer Laboratories Model PL-220. The column and carousel compartments were operated at 140° C. The columns used were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained 200 ppm of butylated hydroxytoluene (BHT). Samples were prepared by agitating lightly for two hours at 160° C. The injection volume used was 100 microliters, and the flow rate was 1.0 milliliters/minute.

Calibration of the GPC column set was performed with 21 narrow molecular weight distribution polystyrene standards, with molecular weights ranging from 580 to 8,400,000, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standard mixtures were run first, and in order of decreasing highest molecular weight component to minimize degradation. The polystyrene standard peak molecular weights were converted to polyethylene molecular weights using the following equation, Mpolyethylene=A×(Mpolystyrene)$^B$, where M is the molecular weight, A has a value of 0.431, and B is equal to 1.0. Polyethylene equivalent molecular weight calculations were performed using VISCOTEK TriSEC software Version 3.0.

Rheology

Each sample was compression molded into a disk for rheology measurement. The disks were prepared by pressing the samples into "3.0 mm thick" plaques, and were subsequently cut into "25 mm diameter" disks. The compression molding procedure was as follows: 350° F. (177° C.) for five minutes, at 1500 psi (10.3 MPa), under N2 purge protection, then the chase was transferred into an ambient temperature oven, with N2 purge, until the sample plaque was solidified, and then the plaque was removed from the chase.

The resin rheology was measured on the ARES-LS model Rheometer from TA Instruments. The ARES is a strain controlled rheometer. A rotary actuator (servomotor) applies shear deformation in the form of strain to a sample. In response, the sample generates torque, which is measured by the transducer. Strain and torque are used to calculate dynamic mechanical properties, such as modulus and viscosity. The viscoelastic properties of the sample were measured, in the melt, using a "25 mm diameter" parallel plate set up, at 190° C., and as a function of varying frequency (range 500 s$^{-1}$ to 0.01 s$^{-1}$). A small constant strain (5%) was applied to ensure the measurement was in the linear viscoelastic region. The storage modulus (G'), loss modulus (G"), tan delta (G"/G'), and complex viscosity (eta*) of the resin were determined using Rheometrics Orchestrator software (v. 6.5.8).

Structural Characterization

The vinyls/1000 C, and trans vinyls/1000 C content were determined by ASTM D 6248; and methyl groups/1000 C was determined by ASTM D2238.

Extrudate Swell Method

Extrudate swell testing was used to evaluate the average extrudate swell of a polymer strand leaving the die of an extruder, in a range of time representative of a manufacturing process, such as blow molding process. A strand of polymer was produced by a piston-driven capillary rheometer (Göttfert Rheograph 2003, equipped with a "12 mm diameter" barrel and a "1 mm diameter" circular die of length 10 mm, with a 90° entrance angle) at shear rates of either 300 s$^{-1}$ or 1000 s$^{-1}$, and at a temperature of 190° C. The volumetric flow rate was kept constant. The strand was cut at a distance of 4 cm from the die exit, and the timer started. When the strand reached a total length of 27 cm (namely an incremental length of 23 cm after the timer started), the timer was stopped. High swell materials produced thicker extrudate whose length grows more slowly than that of lower swell materials. The recorded time for the strand to reach the incremental length of "23 cm" relates to the extrudate swell. The measurement was repeated five times, to account for measurement variability, and the average result was reported. The extrudate swell is herein reported as the time, $t_{1000}$ seconds, required for the extrudate to cover the distance of 23 cm when extruded at a shear rate of 1000 s$^{-1}$, and the time $t_{300}$ seconds, when the extrusion shear rate is 300 s$^{-1}$.

EXPERIMENTAL

The following examples are to illustrate this invention and not to limit the invention. Ratios, parts, and percentages are by weight, unless otherwise stated.

Catalyst was prepared using equipment and methods described in U.S. Pat. No. 6,982,237 (incorporated herein by reference). See also WO 2009/085922. Catalyst was prepared according to the following formulation shown in Table 1. The catalyst formulation was spray dried—see Table 1 below.

TABLE 1

Catalyst Formulation

| Catalyst | |
|---|---|
| Description | 5/1/1/0 |
| Feedstock Charges, kg | |
| Ethanol | 17.65 |
| MgCl2 | 0.875 |
| TiCl3 AA | 0.35 |
| HfCl4 | 0.586 |
| ZrCl4 | 0 |
| CABOSIL TS-610 | 1.3 |
| Spray Drying Conditions | |
| Inlet Temp, C. | 164 |
| Outlet Temp, C. | 100.7 |
| Atomizer Speed, % | 95 |
| Gas Flow, lb/h | 506 |
| Slurry Feed, lb, h | 34 |
| Theoretical Yield, kg | 4.2 |
| % Recovery | 94 |
| Mass Balance Metal Ratios | |
| Mg/Ti | 5.2 |
| Ti/Hf | 0.96 |
| Ti/Zr | NA |
| Mass Balance Composition | |
| wt % ethanol | 22 to 26 |
| mmole Mg/g | 2.2 |
| mmole Ti/g | 0.42 |
| mmole Al/g | 0.14 |
| mmole Hf/g | 0.44 |
| mmole Zr/g | 0 |

Representative Chlorination

The spray dried catalyst precursor was then chlorinated using ethyl aluminum Sesquichloride (EASC) as chlorinating agent, at an aim added Cl/OEth molar ratio of approximately 2.0. A six liter, glass vessel, equipped with a heating jacket and a helical agitator, was used in the chlorination reaction. Some pressure was generated by gases evolved during the chlorination step, due to reaction of residual alcohol with the alkyl groups of the ethyl aluminum sesquichloride.

To the mix tank was charge 2500 grams of hexane. The temperature control was set at 20° C. The agitator was stated at 50% of its maximum speed. The precursor powder (600-700 grams) was then charged to the reactor, and the mixture was stirred for 30 minutes to disperse the precursor. Next, the EASC solution (available as 30% by weight in hexane) was charged to the alkyl charging system. The pressure controller was set to 2 psig. The EASC solution was charged at 100 gram increments, waiting 10 to 15 minutes to observe for gas evolution. The addition was stopped, if excessive foaming occurred, or if the temperature increased above 45° C. The addition was resumed after foaming subsided, and the temperature decreased to less than 45° C. The temperature set point was increased to 50° C., and the slurry was agitated for 60 minutes after reaching that temperature. After 60 minutes of agitation, the agitator was shut off, to allow the slurry to settle out. A decant dip tube was inserted into the tank through a packing gland. The pressure of the tank was increased to approximately 10 psig, and the supernatant liquid was suctioned off.

Isopentane (2500 grams) was charged to the tank, and the slurry was agitated for 30 minutes. The temperature control was set to 35° C. The agitator was shut off, to allow the slurry to settle out. A decant dip tube was inserted into the tank through a packing gland. The pressure of the tank was increased to approximately 10 psig, and the supernatant liquid was suctioned off. The process of isopentane addition, agitation and decantation was then repeated. After the second wash and decant, "2500 cc" of dried HB-380 mineral oil was charged to the tank, and the mixture was slowly agitated, with just enough agitation to start the slurry mixing. The jacket temperature was raised to 45° C., and a vacuum was drawn on the system to pull off residual isopentane. As the material foamed, the vacuum was regulated to prevent any carryover. When the internal temperature began to rise to greater than 35° C., the vacuum was discontinued. The catalyst was then discharged to a sample container, and was ready for use.

The continuity additive was a mixture of aluminum distearate, and commercially available AS-990 (ethoxylated stearyl amine) dispersed in mineral oil, at 10 weight percent loading of each component. The HB-380 mineral oil was typically used, but any dry, oxygen free, high viscosity mineral oil may be used as the dispersant.

Polymerizations were carried out in a pilot scale reactor as described in U.S. Pat. No. 6,187,866, incorporated herein by reference. Catalyst was fed only to the first reactor. Cocatalyst and Continuity Additive (CA) were also fed separately to the first reactor. CA feed occurred at a bed height approximately one foot above the catalyst feed point, however this is not a critical feature of the polymerization process. CA feed rate was maintained at about 5 to 50 ppm, based on the polymer production rate, at a level sufficient to control sheet formation.

In the representative polymerizations, as shown in the tables below, no comonomer was deliberately added to the second reactor; however small amounts (equivalent to that dissolved in the polymer; comonomer to ethylene molar ratio less than 0.001/1 (on-line gas chromatography to reactor)) are carried over into the second reactor. There was optional cocatalyst feed to this second reactor. Reaction conditions used to produce these samples are given in Tables 2 and 3.

Resin properties are shown in Tables 4-9. An overlay of melt strength data is shown in FIG. 1. The inventive resins are especially suitable for extrusion, blow molded containers, such as Jerry cans.

It has been discovered that the inventive compositions offer overall improved processing, increased melt strength for improved parison sag resistance, higher swell, and broad molecular weight distribution for easy processing, as compared to comparative bimodal resins (see comparative examples A and B). In comparison to unimodal resins (see comparative examples C-E), which are typically chrome catalyzed, it has been discovered that the inventive resins offer equivalent processing, superior mechanical properties, and the option to produce down gauged containers, while meeting key performance criteria. The unique combination of features of the inventive compositions provides for the above improved processing and above improved resin properties over compositions of the art.

TABLE 2

Reactor Conditions

|  | Example | | | | | |
|---|---|---|---|---|---|---|
|  | A (Comp.) | | B (Comp.) | | 1 (Inv.) | |
|  | Reactor | | | | | |
|  | HMW (first reactor) | Final (second reactor) | HMW (first reactor) | Final (second reactor) | HMW (first reactor) | Final (second reactor) |
| Catalyst | Mg/Ti | | Mg/Ti | | Mg/Ti/Hf | |
| Cocatalyst Al added (ppm)* | 31 | 51 | 43 | 52 | 16 | 20 |
| Continuity Aid (ppm)** |  |  |  |  | 7.0 |  |
| Reactor Temperature (° C.) | 80.0 | 110.0 | 80.0 | 110.0 | 82.0 | 110.0 |
| Reactor Pressure (psig) | 347 | 392 | 348 | 394 | 349 | 392 |
| C2 Partial Pressure (psi) | 35.1 | 71.2 | 30.0 | 72.8 | 85.2 | 62.8 |
| H2/C2 Molar Ratio | 0.078 | 2.0 | 0.069 | 2.3 | 0.134 | 0.6 |
| C6/C2 Molar Ratio | 0.012 | 0.000 | 0.023 | 0.000 | 0.008 | 0.000 |
| Isopentane (mole %) | 10.1 | 2.9 | 10.1 | 9.1 | 16.2 | 21.2 |
| Split*** | 60.4% | | 59.1% | | 62.1% | |

*ppm based on amount of polymer produced.
**ppm based on amount of polymer produced..
***weight percent of high molecular weight component, based on total polymer produced.

TABLE 3

Reactor Conditions

|  | Example | | | |
|---|---|---|---|---|
|  | 2 (Inv.) | | 3 (Inv.) | |
|  | Reactor | | | |
|  | HMW (first reactor) | Final (second reactor) | HMW (first reactor) | Final (second reactor) |
| Catalyst | Mg/Ti/Hf | | Mg/Ti/Hf | |
| Cocatalyst Al added (ppm)* | 25 | 17 | 26 | 29 |

TABLE 3-continued

Reactor Conditions

|  | Example | | | |
|---|---|---|---|---|
|  | 2 (Inv.) | | 3 (Inv.) | |
|  | Reactor | | | |
|  | HMW (first reactor) | Final (second reactor) | HMW (first reactor) | Final (second reactor) |
| Continuity Aid (ppm)** | 2.9 | | 8.1 | |
| Reactor Temperature (° C.) | 82.0 | 110.0 | 82.0 | 110.0 |
| Reactor Pressure (psig) | 349 | 392 | 348 | 393 |
| C2 Partial Pressure (psi) | 59.9 | 83.8 | 70.1 | 115.7 |
| H2/C2 Molar Ratio | 0.098 | 1.8 | 0.092 | 1.2 |
| C6/C2 Molar Ratio | 0.01 s-6 | 0.000 | 0.012 | 0.001 |
| Isopentane (mole %) | 16.1 | 2.9 | 18.0 | 0.7 |
| Split*** | 57.9% | | 56.6% | |

*ppm based on amount of polymer produced.
**ppm based on amount of polymer produced.
***weight percent of high molecular weight component, based on total polymer produced.

TABLE 4

Resin Properties

|  | Example | | | | | |
|---|---|---|---|---|---|---|
|  | A | | B | | 1 | |
|  | HMW (first reactor) | Final (second reactor) | HMW (first reactor) | Final (second reactor) | HMW (first reactor) | Final (second reactor) |
| Melt Index ($I_5$) g/10 min |  | 0.45 |  | 0.73 |  | 0.39 |
| Melt Index ($I_{21}$) g/10 min | 0.66 | 8.13 | 0.71 | 14.06 | 0.70 | 7.69 |
| $I_{21}/I_5$ |  | 18.1 |  | 19.3 |  | 19.7 |
| Density g/cm³ | 0.9376 | 0.9553 | 0.9344 | 0.9556 | 0.9411 | 0.9532 |

TABLE 5

Resin Properties

|  | Example | | | |
|---|---|---|---|---|
|  | 2 | | 3 | |
|  | HMW (first reactor) | Final (second reactor) | HMW (first reactor) | Final (second reactor) |
| Melt Index ($I_5$) g/10 min |  | 0.58 |  | 0.55 |
| Melt Index ($I_{21}$) g/10 min | 0.73 | 13.83 | 0.56 | 11.15 |
| $I_{21}/I_5$ |  | 23.8 |  | 20.3 |
| Density g/cm³ | 0.9351 | 0.9534 | 0.9368 | 0.9549 |

TABLE 6

Resin Properties

|  |  | Example | | |
|---|---|---|---|---|
|  | Units | 1 | 2 | 3 |
| Density | g/cm³ | 0.9532 | 0.9534 | 0.9549 |
| $I_5$ | g/10 min | 0.39 | 0.58 | 0.55 |

TABLE 6-continued

Resin Properties

| | Units | Example 1 | Example 2 | Example 3 |
|---|---|---|---|---|
| $I_{21}$ | g/10 min | 7.69 | 13.83 | 11.15 |
| $I_{21}/I_5$ | | 19.7 | 23.8 | 20.3 |
| Extrudate Swell- t300 av | s | 21.4 | 18.2 | 18.1 |
| Extrudate Swell- t1000 av | s | 7.9 | 6.2 | 7.5 |
| Tan Delta (0.01 s$^{-1}$, 190° C.) | | 1.5 | 1.7 | 1.7 |
| Tan Delta (100 s$^{-1}$, 190° C.) | | 0.6 | 0.6 | 0.6 |
| Tan Delta (0.01 s$^{-1}$, 190° C.)/Tan Delta (100 s$^{-1}$, 190° C.) | | 2.6 | 3.0 | 3.0 |
| $\eta$ (0.01 s$^{-1}$, 190° C.) | Pa·s | 192,000 | 143,000 | 156,000 |
| $\eta$ (100 s$^{-1}$, 190° C.) | Pa·s | 2,025 | 1,585 | 1,810 |
| $\eta$ (0.01 s$^{-1}$, 190° C.)/$\eta$ (100 s$^{-1}$, 190° C.) | | 94.8 | 90.2 | 86.2 |
| DSC Tm1 | ° C. | | 132.1 | 131.4 |
| DSC Tc1 | ° C. | 118.3 | 117.7 | 120.0 |
| GPC Mn | g/mol | 18,240 | 8,443 | 11,698 |
| GPC Mw | g/mol | 236,154 | 227,296 | 215,491 |
| GPC Mw/Mn | | 12.9 | 26.9 | 18.4 |
| GPC Mz | g/mol | 1,404,434 | 1,394,241 | 1,205,942 |
| ESCR (10% IGEPAL) F50 | h | 453 | >1000 | >1000 |
| Flexural Modulus | psi | 231,593 | 211,228 | 224,558 |

TABLE 7

Resin Properties

| Example | Units | A | B | C[a] | D[b] | E[c] |
|---|---|---|---|---|---|---|
| Density | g/cm³ | 0.9553 | 0.9556 | 0.9518 | 0.9485 | 0.9485 |
| $I_5$ | g/10 min | 0.45 | 0.73 | 0.66 | 0.65 | 0.31 |
| $I_{21}$ | g/10 min | 8.13 | 14.06 | 13.49 | 12.0 | 9.8 |
| $I_{21}/I_5$ | | 18.1 | 19.3 | 20.5 | 18.6 | 31.7 |
| Extrudate Swell- t300 av | s | 13.8 | 13.9 | 28.1 | 26.6 | 22.0 |
| Extrudate Swell- t1000 av | s | 4.8 | 4.8 | 9.6 | 9.5 | 7.8 |
| Tan Delta (0.01 s$^{-1}$, 190° C.) | | 2.4 | 2.8 | 1.4 | 1.8 | 1.2 |
| Tan Delta (100 s$^{-1}$, 190° C.) | | 0.5 | 0.5 | 0.7 | 0.7 | 0.6 |
| Tan Delta (0.01 s$^{-1}$,190 C.)/Tan Delta (100 s$^{-1}$, 190 C.) | | 4.6 | 5.2 | 2.1 | 2.7 | 1.9 |
| $\eta$ (0.01 s$^{-1}$, 190° C.) | Pa·s | 113,000 | 81,684 | 136,000 | 108,000 | 222,000 |
| $\eta$ (100 s$^{-1}$, 190° C.) | Pa·s | 2,115 | 1,769 | 1,492 | 1,787 | 1,740 |
| $\eta$ (0.01 s$^{-1}$, 190° C.)/$\eta$ (100 s$^{-1}$, 190° C.) | | 53.4 | 46.2 | 91.2 | 60.4 | 127.6 |
| DSC Tm1 | ° C. | 133.3 | 132.3 | 131.7 | 129.5 | 130.5 |
| DSC Tc1 | ° C. | 117.8 | 117.6 | 116.7 | 116.1 | 117.4 |
| GPC Mn | g/mol | 13,006 | 9,891 | 12,892 | 12,525 | 16,169 |
| GPC Mw | g/mol | 184,837 | 181,230 | 203,401 | 218,159 | 177,905 |
| GPC Mw/Mn | | 14.2 | 18.3 | 15.8 | 17.4 | 11.0 |
| GPC Mz | g/mol | 707,468 | 803,959 | 1,542,880 | 1,502,651 | 983,916 |
| ESCR (10% IGEPAL) F50 | h | 486 | >1000 | 179 | 623 | 90 |
| Flexural Modulus | psi | 214,133 | 236,438 | 200,540 | 109,518 | 132,677 |

[a] Unimodal ethylene/hexene (EH) copolymer, Cr catalyst.
[b] Ineos K44-11-128.
[c] Chevron HXM 50100.

TABLE 8

Resin Properties

| | Example 1 | Example 2 | Example 3 |
|---|---|---|---|
| Methyls per 1000 Carbon | 1.8 | 4.31 | 1.66 |
| Trans per 1000 Carbon | 0.055 | 0.039 | 0.037 |
| Vinyls per 1000 Carbon | 0.17 | 0.18 | 0.19 |

TABLE 9

Resin Properties

| | Example A | B | C | D | E |
|---|---|---|---|---|---|
| Methyls per 1000 Carbon | 2.11 | 2.77 | 1.67 | 2.13 | 2.23 |
| Trans per 1000 Carbon | 0.078 | 0.029 | 0.063 | 0.009 | 0.005 |
| Vinyls per 1000 Carbon | 0.12 | 0.14 | 1.13 | 0.93 | 0.80 |

The invention claimed is:

1. A jerry can formed from a composition comprising a first composition, wherein the first composition comprises a first ethylene-based polymer, which has a high load melt index (I21)≥0.4 g/10 min, and a density from 0.930 g/cm$^3$ to 0.950 g/cm$^3$, and a second ethylene-based polymer, which has a density greater than, or equal to, 0.955 g/cm$^3$, and wherein the first composition has a high load melt index ($I_{21}$) from 11.15 to 13.83 g/10 min, a density from 0.953 g/cm$^3$ to 0.957 g/cm$^3$, a molecular weight distribution MWD (conv), defined as the ratio of the weight average molecular weight to the number average molecular weight (Mw (conv)/Mn (conv)), greater than, or equal to, 16, and less than, or equal to, 28; and a viscosity ratio, $\eta(0.01\ s^{-1})/\eta(100\ s^{-1})$ at 190° C. from 86.2 to 90.2; and wherein the composition does not comprise an azide coupling agent; and wherein the composition has an extrudate swell (t300 measured at 300 s$^{-1}$ shear rate and 190° C.) greater than, or equal to, 18 seconds; and wherein the first ethylene-based polymer is present in an amount from 55 to 70 weight percent, based on the sum weight of the first ethylene-based polymer and the second ethylene-based polymer; and wherein the composition comprises greater than, or equal to, 98 weight percent of the first composition, based on the weight of the composition.

2. The jerry can of claim 1, wherein the first composition has a tan delta, at 0.01 s$^{-1}$ (190° C.), less than 2.3.

3. The jerry can of claim 1, wherein the first composition has a tan delta, at 100 s$^{-1}$ (190° C.), less than, or equal to, 2.0.

4. The jerry can of claim 1, wherein the first ethylene-based polymer is an ethylene-based interpolymer.

5. The jerry can of claim 1, wherein the composition has an environmental stress crack resistance F50 greater than 400 hours, as determined by ASTM D1693, Method B, in 10% aqueous IGEPAL.

6. The jerry can of claim 1, wherein the first composition has a "vinyls/1000 C" value, as determined by ASTM D6248, less than or equal to 0.3.

7. The jerry can of claim 1, wherein the composition has a "vinyls/1000 C" value, as determined by ASTM D6248, less than or equal to 0.3.

8. The jerry can of claim 1, wherein the first composition comprises greater than, or equal to, 95 weight percent of the sum weight of the first ethylene-based polymer and the second ethylene-based polymer, based on the weight of the first composition.

9. The jerry can of claim 1, wherein the first composition comprises greater than, or equal to, 98 weight percent of the sum weight of the first ethylene-based polymer and the second ethylene-based polymer, based on the weight of the first composition.

10. The jerry can of claim 1, wherein the jerry can is an extrusion blow molded article.

11. The jerry can of claim 1, wherein the first composition is polymerized in the present of a mixture of aluminum distearate, and ethoxylated stearyl amine dispersed in mineral oil, at 10 weight percent loading of each of these components.

12. The jerry can of claim 1, wherein the composition has a melt index ($I_5$) from 0.2 to 0.8 g/10 min.

13. A tight head pail container formed from a composition comprising a first composition, wherein the first composition comprises a first ethylene-based polymer, which has a high load melt index (I21)≥0.4 g/10 min, and a density from 0.930 g/cm$^3$ to 0.950 g/cm$^3$, and a second ethylene-based polymer, which has a density greater than, or equal to, 0.955 g/cm$^3$, and wherein the first composition has a high load melt index ($I_{21}$) from 11.15 to 13.83 g/10 min, a density from 0.953 g/cm$^3$ to 0.957 g/cm$^3$, a molecular weight distribution MWD (conv), defined as the ratio of the weight average molecular weight to the number average molecular weight (Mw (conv)/Mn (conv)), greater than, or equal to, 16, and less than, or equal to, 28; and a viscosity ratio, $\eta(0.01\ s^{-1})/\eta(100\ s^{-1})$ at 190° C., from 86.2 to 90.2; and wherein the composition does not comprise an azide coupling agent; and wherein the composition has an extrudate swell (t300 measured at 300 s$^{-1}$ shear rate and 190° C.) greater than, or equal to, 18 seconds; and wherein the first ethylene-based polymer is present in an amount from 55 to 70 weight percent, based on the sum weight of the first ethylene-based polymer and the second ethylene-based polymer; and wherein the composition comprises greater than, or equal to, 98 weight percent of the first composition, based on the weight of the composition.

14. The tight head pail container of claim 13, wherein the first ethylene-based polymer is an ethylene-based interpolymer.

15. The tight head pail container of claim 13, wherein the composition has an environmental stress crack resistance F50 greater than 400 hours, as determined by ASTM D1693, Method B, in 10% aqueous IGEPAL.

16. The tight head pail container of claim 13, wherein the first composition comprises greater than, or equal to, 95 weight percent of the sum weight of the first ethylene-based polymer and the second ethylene-based polymer, based on the weight of the first composition.

17. The tight head pail container of claim 13, wherein the tight head pail container is an extrusion blow molded article.

\* \* \* \* \*